United States Patent
Vermoesen et al.

(10) Patent No.: US 6,920,818 B2
(45) Date of Patent: Jul. 26, 2005

(54) DUAL TANDEM POWER PISTON-ATTACHMENT CONCEPT

(75) Inventors: Michel J. Vermoesen, Miamisburg, OH (US); Ryan M. Elking, Miamisburg, OH (US); Patrick T. MacLellan, Springboro, OH (US); Derek T. Dreischarf, Kettering, OH (US)

(73) Assignee: Delphi Technologies, Inc., Troy, MI (US)

( * ) Notice: Subject to any disclaimer, the term of this patent is extended or adjusted under 35 U.S.C. 154(b) by 76 days.

(21) Appl. No.: 10/409,327

(22) Filed: Apr. 8, 2003

(65) Prior Publication Data

US 2004/0200351 A1 Oct. 14, 2004

(51) Int. Cl.$^7$ .................................................. F15B 9/10
(52) U.S. Cl. ................................................... 91/376 R
(58) Field of Search .................. 92/100, 255; 91/376 R

(56) References Cited

U.S. PATENT DOCUMENTS

| | | | | |
|---|---|---|---|---|
| 4,729,289 A | * | 3/1988 | Boehm | 91/376 R |
| 6,006,649 A | * | 12/1999 | Parker et al. | 91/376 R |
| 6,164,183 A | | 12/2000 | Fulks et al. | 91/376 R |
| 6,209,442 B1 | | 4/2001 | Haerr et al. | |
| 6,374,721 B1 | | 4/2002 | Zehnder, II et al. | 91/367 |
| 6,516,705 B2 | | 2/2003 | Vermoesen et al. | 91/376 R |
| 6,561,075 B2 | | 5/2003 | Haerr et al. | 91/369.2 |
| 6,626,080 B2 | | 9/2003 | Haerr et al. | 91/376 R |

* cited by examiner

Primary Examiner—Thomas E. Lazo
(74) Attorney, Agent, or Firm—Michael D. Smith

(57) ABSTRACT

A vehicle braking system vacuum booster tandem power piston connection design such that the primary piston and the secondary piston are positioned together forming the tandem power piston. A connection design that provides direct alignment between the primary piston and secondary piston upon assembly and also provides an airtight seal between the primary piston and the secondary piston when assembling the tandem power piston.

9 Claims, 5 Drawing Sheets ized patent

DUAL TANDEM POWER PISTON-ATTACHMENT CONCEPT

TECHNICAL FIELD OF THE INVENTION

The present invention relates generally to a braking system. In particular, the invention relates to the interconnection of a dual tandem vacuum booster power piston.

BACKGROUND OF THE INVENTION

Larger vehicles need increased braking capacity and that translates into increasing the size of vacuum boosters. Larger vacuum boosters require larger power pistons. The increase in the size of the power piston relates to an increase in both the diameter and length of the power piston. This creates a significant challenge for the designers of the vacuum booster power piston.

The power piston is the most critical part of the vacuum booster and as such performs numerous functions such as transmitting input load, transmitting load from the primary and secondary diaphragms/support plates, receiving and maintaining a floating control valve, and determining the reaction ratio. These functions dictate that the power piston must sustain high levels of stress and exhibit tight tolerances to achieve the desired performance requirements. In larger and longer stroke vacuum booster applications, it is now extremely difficult to obtain a power piston that can handle the combination of high loading conditions and tight tolerances due to the capability and quality problems associated with the molding of a longer power piston. To overcome this problem, brake manufactures are starting to make power pistons in two pieces.

However, two-piece power piston arrangements presented additional challenges to brake manufactures. The assembly of a tandem power piston is cumbersome because of the multitude of parts to be assembled and alignment problem between the primary power piston the secondary power piston during assembly. Additionally, there have been problems in effectively connecting the two-piece power piston. There has also been a problem with establishing and maintaining an airtight seal between the two pieces of the tandem power piston, the primary piston and secondary piston.

It would be desirable, therefore, to provide a vehicle braking system vacuum booster tandem power piston connection design that overcomes these and other disadvantages.

SUMMARY OF THE INVENTION

One aspect of the invention provides a vacuum booster power piston comprising a primary piston with a secondary piston that includes an opening to receive the primary piston. The primary piston is then inserted into the first end of the secondary piston sliding through and coming into contact with the second end of the secondary piston. The secondary piston is configured such that the second end of the secondary piston that is in contact with the primary piston has a shoulder area internal to the secondary piston that comes into contact with an external shoulder on the primary piston. A primary support is positioned on the outer surface of the primary piston that operably connects with the secondary piston. A diaphragm is then positioned on the outer surface of the primary piston and is operably connected to the primary support. A primary retainer is then positioned next to the diaphragm on the outer surface of the primary piston. The primary retainer is in contact with the diaphragm wherein the primary retainer contacting with the outer surface of the primary piston exerts an axial clamping force against the diaphragm and primary support thereby positioning the primary piston within the secondary piston.

Another aspect of the invention provides for a vacuum booster power piston comprising a power piston and a secondary piston. The secondary piston includes an opening to receive the primary piston. A primary support is positioned on an outer surface of the primary piston, adjacent to an outer end of the secondary piston. A diaphragm is positioned adjacent to the primary support, on an outer surface of the primary piston. A primary retainer is operably connected with the outer surface of the primary piston, and holds the primary piston in contact with the secondary piston. The primary retainer is made from a material harder than the primary piston.

A third aspect of the invention provides a method for assembling a dual tandem power piston for a vacuum booster. The method provides that one end of a primary piston is positioned into a secondary piston to contact with and be operably connected to an internal shoulder of the secondary piston. A primary support is positioned on an outer surface of the primary piston adjacent to the secondary piston. A diaphragm is positioned over the outer surface of the primary piston adjacent to the primary support, and a primary retainer is positioned over the outer surface of the primary piston adjacent the diaphragm and snap fitted into a secure position.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENT

Figure 1:
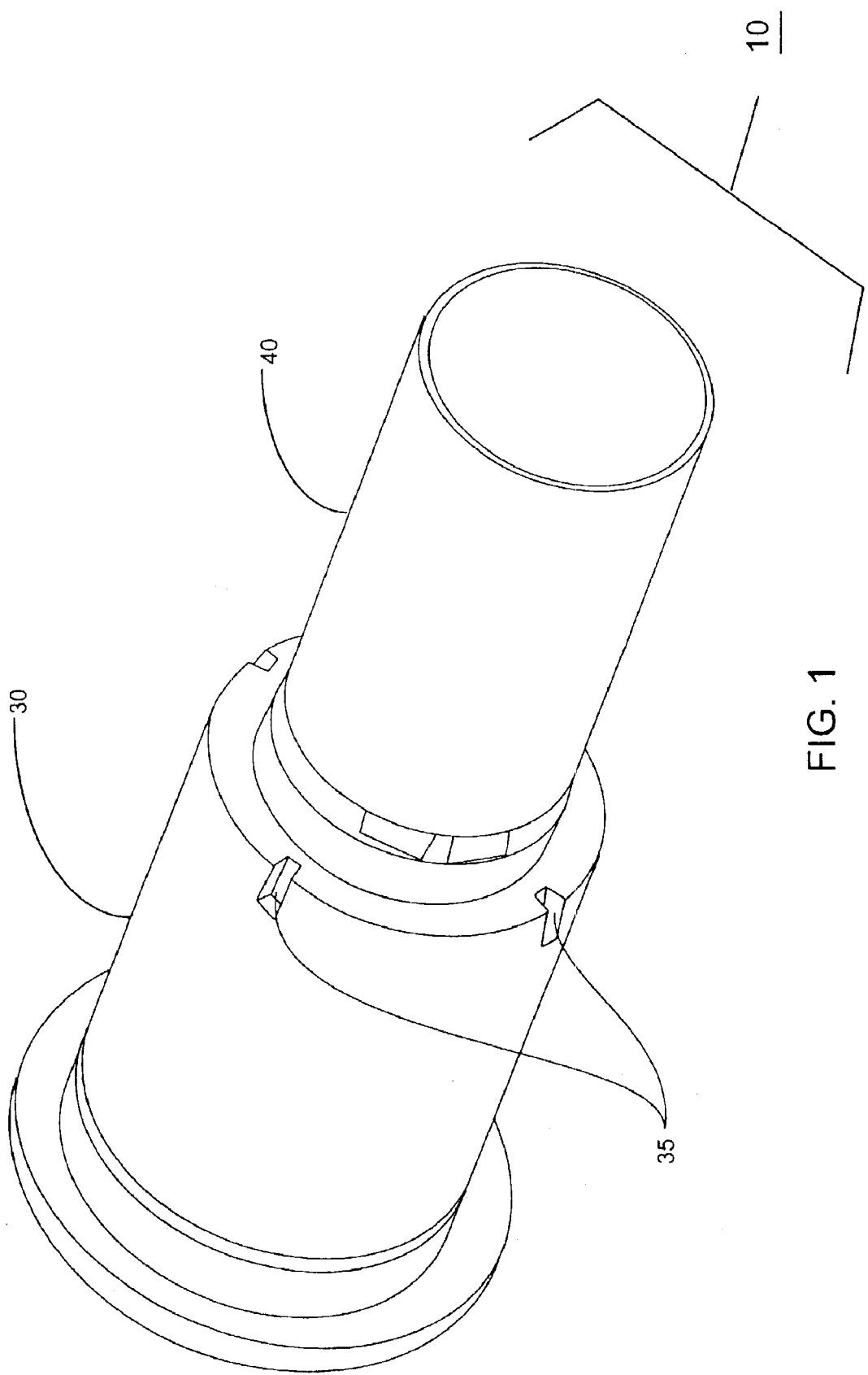
FIG. 1 is an arrangement view of one embodiment of the tandem power piston in accordance with the invention;.

FIG. 1 illustrates an arrangement view of one embodiment of a tandem power piston 10. As shown in FIG. 1, tandem power piston 10 includes primary piston 40, and secondary piston 30.

Figure 2:
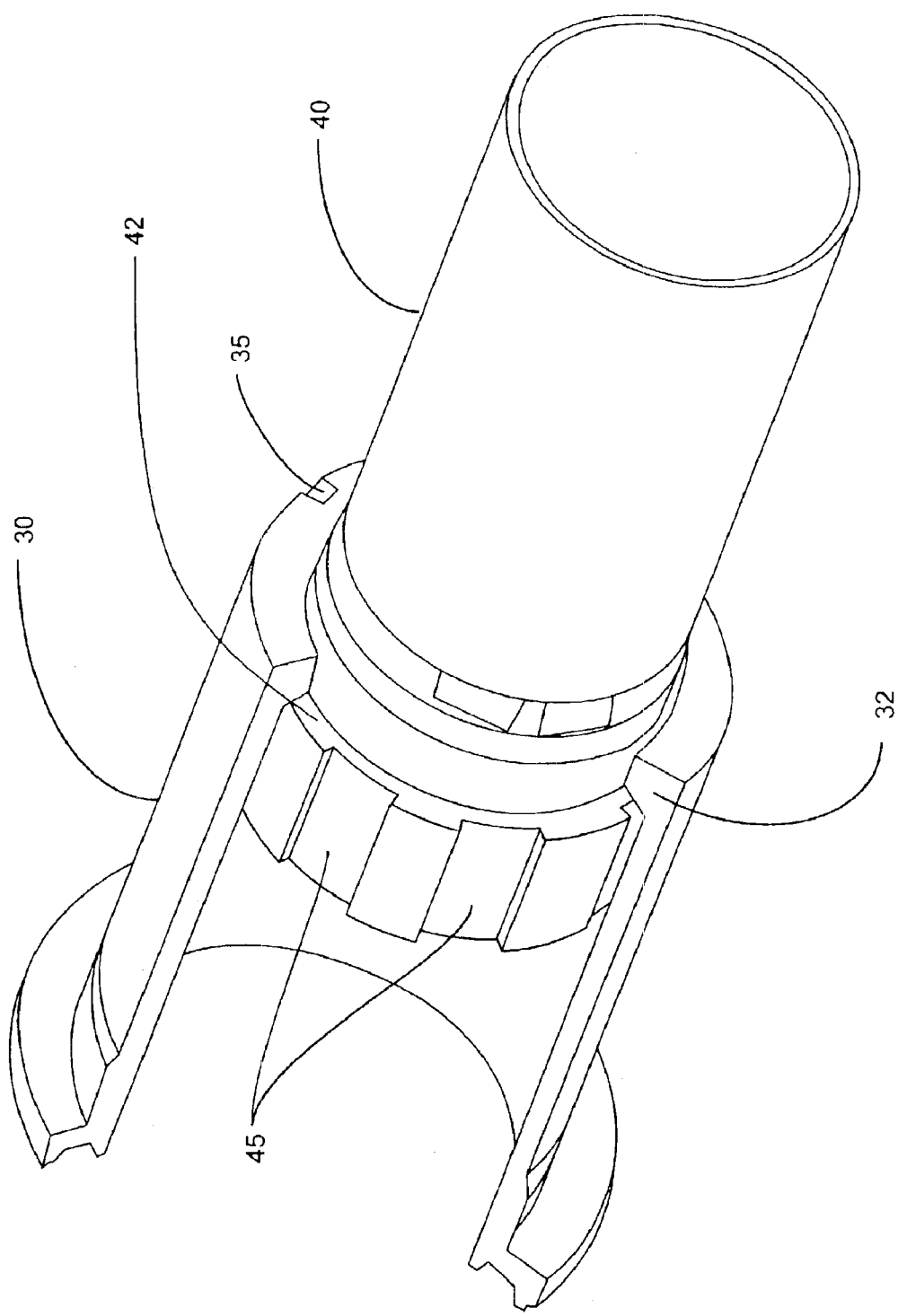
FIG. 2 is a partial cutaway view of the tandem power piston illustrated in FIG. 1 in accordance with the invention.

FIG. 2 is a partial cutaway view of one embodiment of the tandem power piston 10 illustrated in FIG. 1. Primary piston 40 is inserted into secondary piston 30. Primary piston external shoulder 42 of primary piston 40 comes into contact with secondary piston internal shoulder 32 of secondary piston 30 preventing primary piston 40 from passing through the secondary piston 30. Primary piston 40 may be a piston made of plastic material. Secondary piston 30 may be a piston made of plastic material.

Additionally as illustrated in FIG. 1 and FIG. 2 one embodiment provides for a means to evacuate atmospheric air from within the vacuum power piston 10. The secondary piston 30 has a plurality of air flow ports 35 on the outer surface of the secondary piston 30 and the primary piston 40 has a plurality of air flow grooves 45 cut into the shoulder area 42 which provide the means for atmospheric air to escape from the vacuum booster power piston 10.

Figure 3:
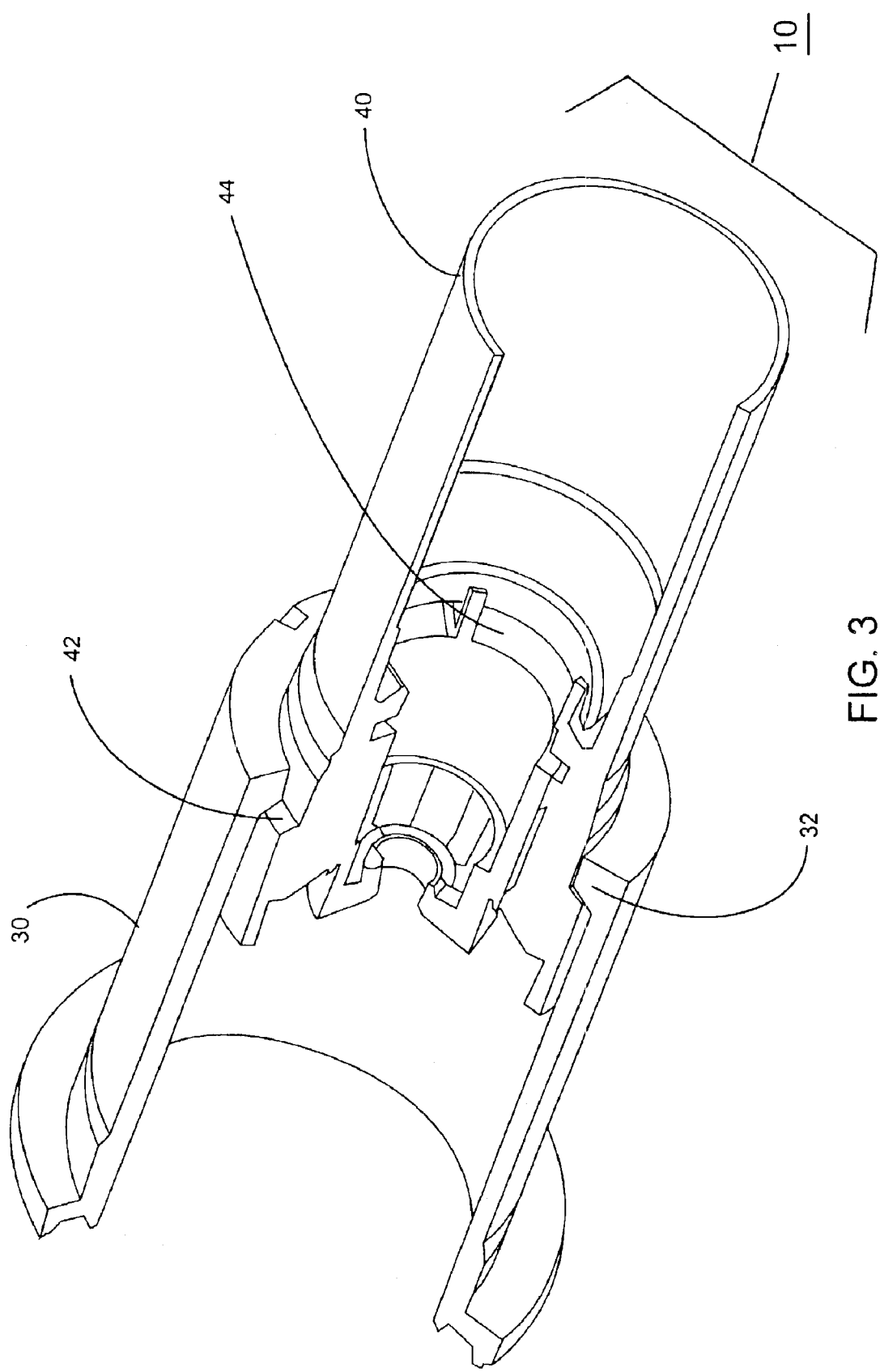
FIG. 3 is a cutaway view of the tandem power piston illustrated in FIG. 1 in accordance with the invention.

FIG. 3 is a cutaway view of one embodiment of the tandem power piston 10 illustrated in FIG. 1. Primary piston 40 is fully inserted into secondary piston 30 with the primary piston external shoulder 42 coming into contact and is operably connected to secondary piston internal shoulder 32. Also, shown in FIG. 3 is a plurality of primary piston internal airflow guidance and assembly alignment vanes 44. The internal airflow guidance and assembly alignment vanes 44 assure appropriate air balance between the primary piston 40 and secondary piston 30. Additionally, the internal airflow guidance and assembly alignment vanes 44 provide for simpler assembly of the primary piston 40 and secondary piston 30. The internal airflow and assembly alignment vanes 44 provide for direct alignment of the secondary piston 30 and the primary piston 40 when assembling a tandem power piston.

Figure 4:
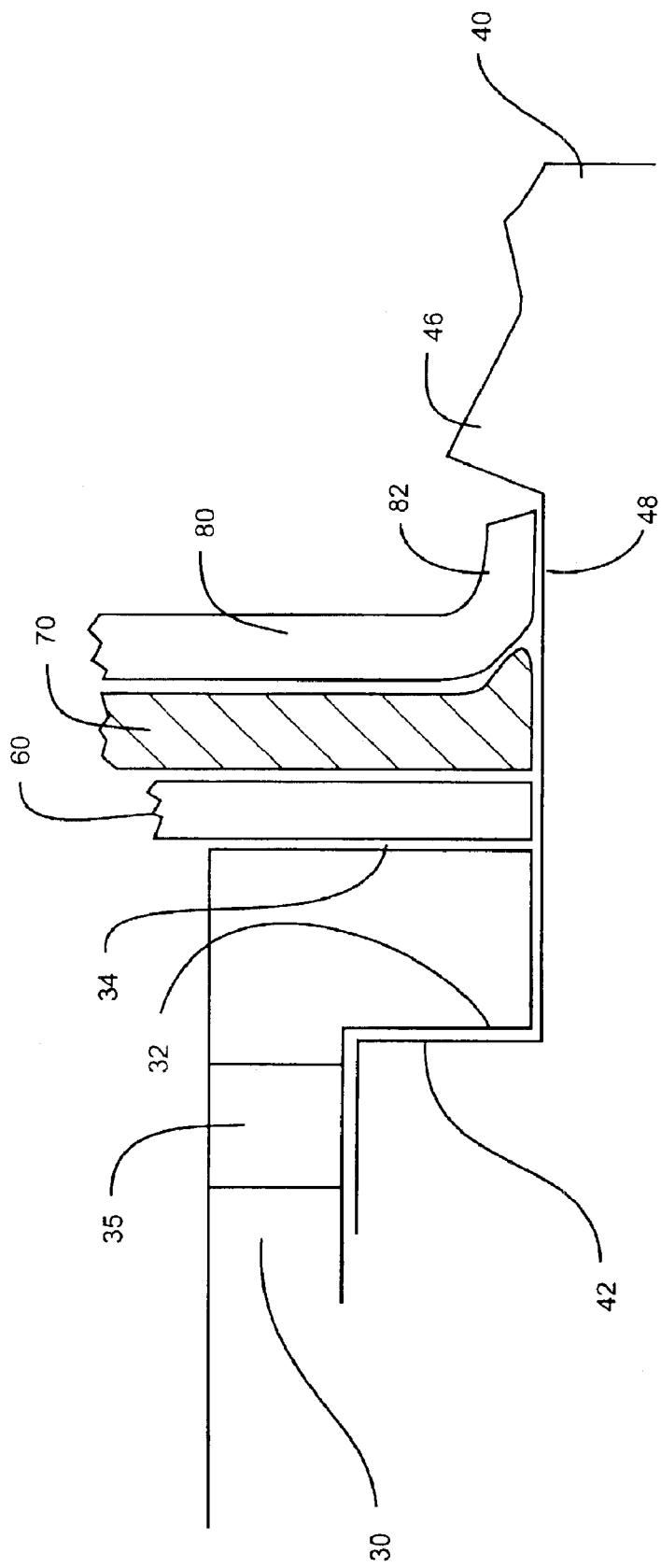
FIG. 4 is a cross sectional view of the tandem power piston illustrated in FIG. 1 in accordance with the invention.

FIG. 4 is a cross sectional view of one embodiment of the tandem power piston 10 illustrated in FIG. 1. As shown in FIG. 4, tandem power piston includes primary piston 40, secondary piston 30, primary support 60, diaphragm 70, and primary retainer 80. Primary support 60, diaphragm 70, and primary retainer 80 hold the primary piston 40 positioned within secondary piston 30. Primary support 60 may be a support made of a plastic material. Diaphragm 70 may be a diaphragm made of a soft plastic or rubber type material. Primary retainer 80 may be a retainer made of either a plastic or harder metallic material.

Additionally, shown in FIG. 4, primary piston 40 is fully inserted into secondary piston 30 with primary piston external shoulder 42 in contact with and operably connected to secondary piston internal shoulder 32. After primary piston 40 as been fully inserted into secondary piston 30, primary support 60 is positioned over the outer surface of primary piston 40 against the secondary piston external shoulder 34. Diaphragm 70 is then positioned over the outside surface of the primary piston 40 and in direct contact with primary support 60. Diaphragm 70 positioned on the outer surface of primary piston 40 and in contact with primary support 60 provides a seal between the primary piston 40 and secondary piston 30. Primary retainer 80 is positioned on the outer surface of primary piston 40 and in direct contact and operably connected with diaphragm 70 exerting an axial clamping force on diaphragm 70 holding diaphragm 70 in direct contact with primary support 60. Primary retainer foot 82 of primary retainer 80 when primary retainer 80 is positioned on the outer surface of the primary piston 40 and in direct contact with diaphragm 70 snap fits into axial groove 48 on the outer surface of the primary piston 40. Axial groove 48 on the outer surface of the primary piston 40 can be created by an actual axial groove in the outer surface of the primary piston 40 or by creating a raised axial ridge 46 on the outer surface of the primary piston 40. Additionally, the primary retainer 80 could be constructed of a metallic material such that the primary retainer foot 82 would operably connect with the outer surface of the primary piston 40 locking the primary retainer against diaphragm 70 and holding primary piston 40 within secondary piston 30.

Figure 5:
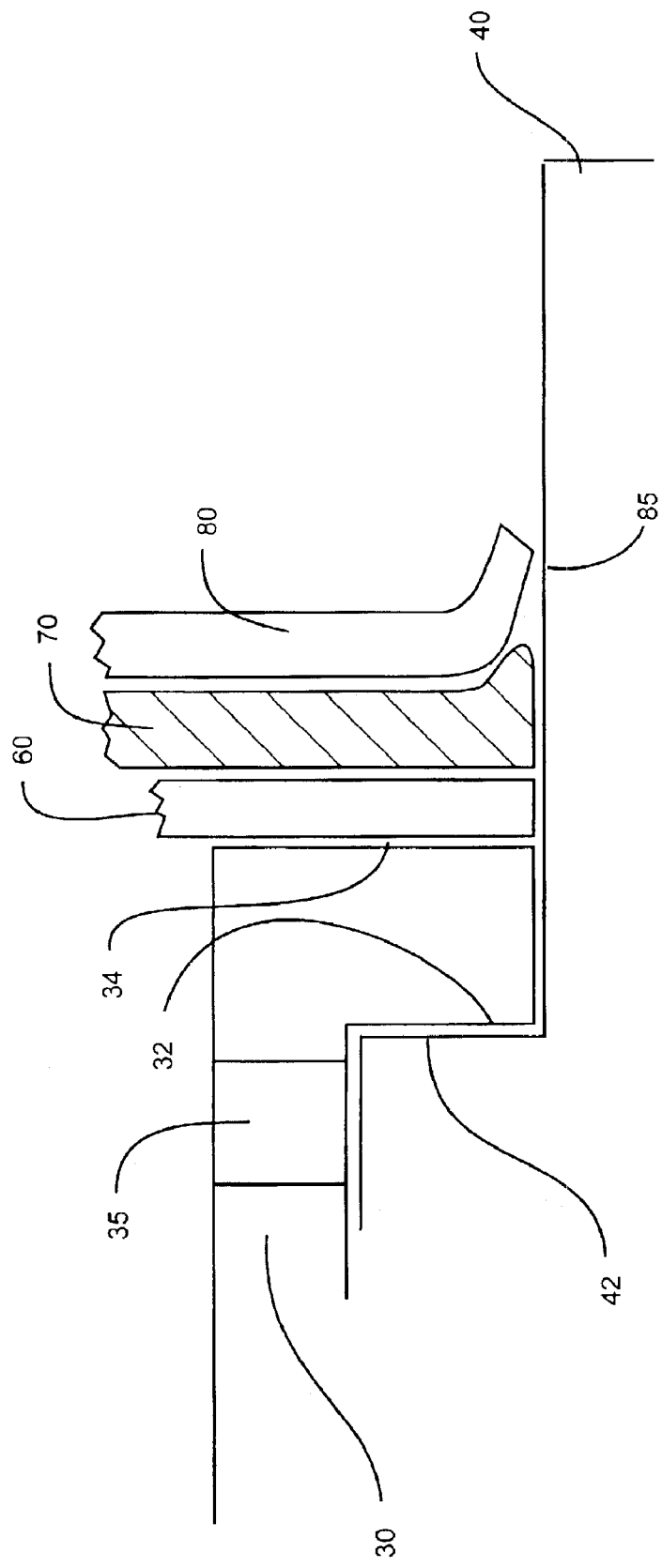
FIG. 5 is a cross sectional view of the tandem power piston illustrated in FIG. 4 in accordance with the invention.

FIG. 5 is a cross sectional view of one embodiment of the tandem power piston 10 illustrated in FIG. 4. As shown in FIG. 5, tandem power piston includes primary piston 40, secondary piston 30, primary support 60, diaphragm 70, and primary retainer 80. Primary support 60, diaphragm 70, and primary retainer 80 hold the primary piston 40 positioned within secondary piston 30. As illustrated in FIG. 5, primary retainer 80 is positioned on the outer surface of primary piston 40 adjacent to diaphragm 70. Primary retainer foot 82 operably connects with the outer surface of primary piston 40 such that primary retainer foot sharp edges 85 cut into and become affixed with the softer outer surface of primary piston 40. Primary retainer foot sharp edges 85 thereby operably connects primary retainer 80 to primary piston 40 positioning primary piston 40 within secondary piston 30.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A vacuum booster power piston, comprising:
    a primary piston comprising a plurality of raised airflow guidance vanes in the internal portion of the primary piston that provide internal airflow guidance;
    a secondary piston including an opening to receive the primary piston;
    a primary support positioned on an outer surface of the primary piston and adjacent to an outer end of the secondary piston;
    a diaphragm positioned on an outer surface of the primary piston adjacent to the primary support;
    a primary retainer in contact with the diaphragm wherein the retainer contacts with the outer portion of the primary piston and exerts an axial clamping force against the diaphragm and primary support to hold the primary piston within the secondary piston.

2. The vacuum booster power piston of claim 1 wherein the diaphragm creates a seal between the primary piston and the secondary piston.

3. The vacuum booster power piston of claim 1 wherein the outer surface area of the primary piston further comprises an elevated radial shaped ridge for securing the primary retainer in a stationary position.

4. The vacuum booster piston of claim 1 wherein the outer surface area of the primary piston further comprises a radial groove such that the primary retainer is held in a stationary position.

5. The vacuum booster power piston of claim 1 wherein primary piston and a secondary piston provide a means to evacuate atmospheric air from within the vacuum booster power piston.

6. The vacuum booster power piston of claim 1 wherein the secondary piston has a plurality of air flow ports located on the outer surface on one end of the primary piston.

7. The vacuum booster power piston of claim 1 wherein the secondary piston has a plurality of air flow grooves cut into the shoulder area of the secondary power piston which is in contact with the primary piston.

8. A vacuum booster power piston, comprising:
    a primary piston a primary piston comprising a plurality of raised airflow guidance vanes in the internal portion of the primary piston that provide internal airflow guidance;
    a secondary piston including an opening to receive the primary piston;
    a primary support positioned on an outer surface of the primary piston and adjacent to an outer end of the secondary piston;

a diaphragm positioned on an outer surface of the primary piston adjacent to the primary support;

a primary retainer of a material much harder than the primary piston material in contact with the diaphragm wherein the retainer contacts with and is operably connected to the outer surface of the primary piston and exerts an axial clamping force against the diaphragm and primary support to hold the primary piston within the secondary piston.

9. A method for assembling a dual tandem power piston for a vacuum booster, the method comprising:

positioning one end of a primary piston into a secondary piston;

positioning the external shoulder of one end of the primary piston in contact with and operably connected to the internal shoulder of the secondary piston;

positioning a primary support on an outer surface of the primary piston and adjacent to one end of the secondary piston;

positioning a diaphragm over the outer surface of the primary piston and adjacent to the primary support;

positioning a primary retainer over the outer surface of the primary piston and adjacent to the diaphragm, snap fitting the primary retainer into a fixed and secured position.

* * * * *